United States Patent Office 3,717,656
Patented Feb. 20, 1973

3,717,656
SELECTIVE CATALYTIC HYDROGENATION OF
2-(4-NITROPHENYL)-4(5)-NITROIMIDAZOLE
William H. Jones, Metuchen, and John M. Chemerda,
Watchung, N.J., assignors to Merck & Co., Inc., Rahway, N.J.
No Drawing. Filed June 29, 1971, Ser. No. 158,127
Int. Cl. C07d 49/36
U.S. Cl. 260—309          1 Claim

ABSTRACT OF THE DISCLOSURE

Selective hydrogenation of 2 - (p-nitrophenyl) - 4(5)-nitroimidazole to 2-(p-aminophenyl)-4(5)-nitroimidazole is accomplished catalytically, using an improvement consisting of an aqueous ammonium hydroxide medium, at a temperature between 20–25° C. The compound produced is an intermediate useful in making compounds having utility against enteroheptatitis and trichomoniasis.

DESCRIPTION OF THE INVENTION

Hydrogenation of an aromatic nitro group to the corresponding amine has long been known to be easily accomplished in high yields. The reduction is usually a catalytic one, with palladium or platinum alone or on high surface area carriers such as carbon, is commonly employed.

When the aromatic compound has more than one nitro functionality, selective reduction has also been accomplished using specific catalysts, hydrogenation times, solvents, etc. in a particular combination for the compound being reduced. Generally speaking, each optional reducing system must be independently determined for each dinitro compound; catalytic hydrogenation has many critical parameters and each must operate in combinations with competing equilibria reactions.

Even though it is recognized by the art that each new catalytic reaction must be approached with an open mind, certain guidelines have been established. One such guideline results in the use of an acidic or neutral medium for the hydrogenation of nitro compounds. In some reductions the presence of acid has proved essential. See, for instance, Paul N. Rylander, "Catalytic Hydrogenation Over Platinum Metals," Academic Press, 1967, p. 170.

The starting compound of this invention is an aromatic dinitro compound, a 2 - (p - nitrophenyl) - 4(5) - nitroimidazole, having the formula:

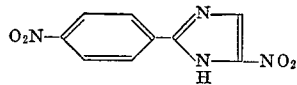

I

The selective reduction product, 2-(p-aminophenyl)-4-(5)-nitroimidazole, is an intermediate compound of value in the synthesis of known compounds useful against the diseases enteroheptatitis and trichomoniasis, specifically, and protozoan-caused diseases, generally. See, for instance, U.S. Pat. 3,446,815.

The selective reduction of compound I is not easily accomplished, however. U.S. Pat. 3,446,815 provides one successful method, using ammonium sulfide under alkaline conditions. This process results in good yields.

However, the use of ammonium sulfide does possess one disadvantage, that of environmental pollution. Today's industrial standard must now be measured not only against cost and yield data, but also evaluated in terms of the broader, and less clearly defined standard of the welfare of the public. The ever-increasing concern with the environment and the effect of industrial operations upon it have necessitated a search for new "cleaner" technology.

OBJECTS OF THE INVENTION

It is, therefore, an object of this invention to provide a new improved method for the selective hydrogenation of 2-(p-nitrophenyl)-4(5)-nitroimidazole to 2-(p-aminophenyl)-4(5)-nitroimidazole. It is another object of this invention to provide a process for the hydrogenation reaction which does not produce undesirable pollutants into the environment. Other objects will be apparent from the detailed description hereinafter provided.

PREFERRED EMBODIMENTS OF THE INVENTION

In accordance with this invention, we have now found that 2 - (p-nitrophenyl)-4(5)-nitroimidazole can be converted in high yields without substantial environmental pollution to the corresponding 2-(p-aminophenyl)-4(5)-nitroimidazole. The reduction is carried out in an aqueous medium using hydrogen over a palladium-on-carbon catalyst. The medium must also contain added ammonium hydroxide, to a final pH of 8 or higher. Surprisingly, it has been found that other bases, such as triethylamine or sodium hydroxide, do not result in high yields of the desired product. In addition, in carrying out the reduction in accordance with this improved procedure, the dinitro compound is dissolved in aqueous ammonia containing the catalyst. Hydrogen gas at a maximum pressure of 40 p.s.i. is passed through the solution. The reaction is continued until the theoretical amount of $H_2$ is taken up. The desired product is then recovered from the resulting reaction mixture.

Since the pH of the reaction mixture is at least 8, an excess of ammonia should be used in the reaction mixture. It is desirable to use at least 2 moles of ammonia per mole of the dinitro compound, and preferably at least 5 moles per mole. Amounts in excess of these can be used. The temperature of the reaction is another critical parameter; the temperature should be preferably between 20–25° C. and should not be permitted to rise above 40° C.

The catalyst used is a palladium-on-carbon (5% palladium, 95% carbon). Other noble metals, such as platinum, can be used with success. The catalyst is empolyed in 1–5% by weight based on the weight of the dinitro compound.

The pressure of the gas is critical to the success of the selective reduction. At ambient temperature and for the amount of dinitro compound, the maximum gas pressure is 40 p.s.i.g., and the minimum gas pressure is about 25 p.s.i.g.

The time of reaction is measured by the uptake of the hydrogen gas. The amount needed to accomplish the selective reduction can be easily calculated. The reaction is terminated when 90–100% of the calculated amount of hydrogen has reacted.

This invention is further illustrated by the following examples.

EXAMPLES (Ia) 2-(p-aminophenyl)-4(5)-nitroimidazole 11.17 g. of 2-(p-nitrophenyl)-4(5)-nitroimidazole is dissolved in 192 ml. of concentrated ammonium hydroxide and reduced using hydrogen at 40 p.s.i.g. The pH is 8.3. 0.234 g. of a 5% palladium-on-carbon catalyst is present in the reduction system. The temperature is maintained between 20° and 22° C. by use of a water bath. The reaction is terminated after 90% of theoretical amount of hydrogen (30 p.s.i.) is taken up after 45 minutes. The reaction mixture is left under nitrogen overnight. The brown solution is then filtered, washed with water under nitrogen. The filtrate is then brought to pH 6.5 using concentrated hydrochloric acid. After aging for 45 minutes and filtering, washing and drying, the product 2-(p-aminophenyl)-4(5)-nitroimidazole is recovered having a weight of 7.52 g. Yield calculation indicated that 75% is selectively hydrogenated. Identity of the product was confirmed using UV and thin-layer chromatography.

Using the same general process as above, the following changes were made as indicated, resulting in the following yields:

(Ib) Instead of 192 ml. of concentrated $NH_4OH$, the solvent used is 300 ml. of methanol containing 25 ml. of glacial acetic acid. The pH is about 4.5. The yield of product, 2-(p-aminophenyl)-4(5)-nitroimidazole, is 20.8%.

(Ic) Instead of 192 ml. of concentrated $NH_4OH$, the solvent used is one liter of 1,2-dimethoxy ethylene containing 100 ml. of triethylamine. The pH is approximately 8. The yield of product, 2-(p-aminophenyl)-4(5)-nitroimidazole, is 35%.

(Id) Instead of 192 ml. of concentrated $NH_4OH$, the solvent used is 320 ml. of 2-butyl alcohol containing 15 ml. of 1 N sodium hydroxide. The pH is approximately 8. The yield of product, 2-(p-aminophenyl)-4(5)-nitroimidazole, is 38%.

(Ie) Instead of the use of a constant temperature bath, the reaction temperature is permitted to fluctuate with the course of reaction. A rapid temperature rise is observed when hydrogenation is started, to 57° C. The final temperature at the end of the reduction, which took 71 minutes, is 48° C. The yield of product, 2-(p-aminophenyl)-4(5)-nitroimidazole, is 58%.

What is claimed is:
1. In a process for the selective reduction of the compound 2-(p-nitrophenyl)-4(5)-nitroimidazole to the product 2-(p-aminophenyl)-4(5)-nitroimidazole using hydrogen gas in the presence of platinum or palladium catalyst, the improvement consisting of the use of a medium consisting of aqueous ammonium hydroxide having a pH of at least 8, and passing hydrogen gas at a maximum pressure of 40 p.s.i.g. through the medium containing said nitrophenyl imidazole while maintaining the reaction temperature between 20–25 °C.

References Cited
UNITED STATES PATENTS

| | | | |
|---|---|---|---|
| 3,446,815 | 5/1969 | Kollonitsch | 260—309 |
| 3,487,087 | 12/1969 | Sarett et al. | 260—309 |

OTHER REFERENCES

Ochiai et al.: Chem. Abst., vol. 35, columns 458–9 (1941).

NATALIE TROUSOF, Primary Examiner

U.S. Cl. X.R.

260—689